United States Patent
Shi et al.

(10) Patent No.: US 11,812,306 B2
(45) Date of Patent: Nov. 7, 2023

(54) SYNCHRONIZED DEVICE-NETWORK MEDIA NEGOTIATION AND NOTIFICATION

(71) Applicant: Verizon Patent and Licensing Inc., Basking Ridge, NJ (US)

(72) Inventors: Weimin Shi, Bridgewater, NJ (US); Jun Yuan, Cranbury, NJ (US); Hui Zhao, Marlboro, NJ (US); Nanjun Qian, Princeton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 172 days.

(21) Appl. No.: 17/221,328

(22) Filed: Apr. 2, 2021

(65) Prior Publication Data
US 2022/0322151 A1 Oct. 6, 2022

(51) Int. Cl.
*H04W 28/22* (2009.01)
*H04W 56/00* (2009.01)
*H04W 72/51* (2023.01)

(52) U.S. Cl.
CPC ......... *H04W 28/22* (2013.01); *H04W 56/001* (2013.01); *H04W 72/51* (2023.01)

(58) Field of Classification Search
None
See application file for complete search history.

(56) References Cited

U.S. PATENT DOCUMENTS

| | | | | |
|---|---|---|---|---|
| 5,987,319 A | * | 11/1999 | Hermansson | H04W 52/267 455/450 |
| 2019/0190635 A1 | * | 6/2019 | Goel | H04J 3/0667 |
| 2019/0215729 A1 | * | 7/2019 | Oyman | H04L 65/1016 |
| 2021/0120456 A1 | * | 4/2021 | Choi | H04L 65/102 |
| 2021/0360480 A1 | * | 11/2021 | Oyman | H04L 65/1104 |

* cited by examiner

*Primary Examiner* — Walter J Divito

(57) ABSTRACT

An improved cellular network communications scheme enables synchronization of end-to-end session parameters between a radio access network and user equipment. In one embodiment, a method is disclosed comprising receiving, at an access point, a first notification from user equipment (UE), the first notification including data representing a capability of the UE; receiving, at the access point, a second notification from the UE, the second notification including data representing a negotiated session parameter; detecting, by the access point, a change in quality of a network link associated with the UE; and disabling, by the access point, a transmission of a recommendation to the UE based on the negotiated session parameter.

20 Claims, 7 Drawing Sheets

SYNCHRONIZED DEVICE-NETWORK MEDIA NEGOTIATION AND NOTIFICATION

BACKGROUND INFORMATION

User equipment (UE) in a cellular network may establish end-to-end communications sessions that are transparent to the radio access network (RAN) and core network. During such sessions, the session parameters used by the UE may differ from the session parameters assumed by the RAN or core network. As a result, the RAN may transmit unnecessary data based on the lack of synchronization between UEs and the RAN.

DETAILED DESCRIPTION OF EXAMPLE EMBODIMENTS

Figure 1:
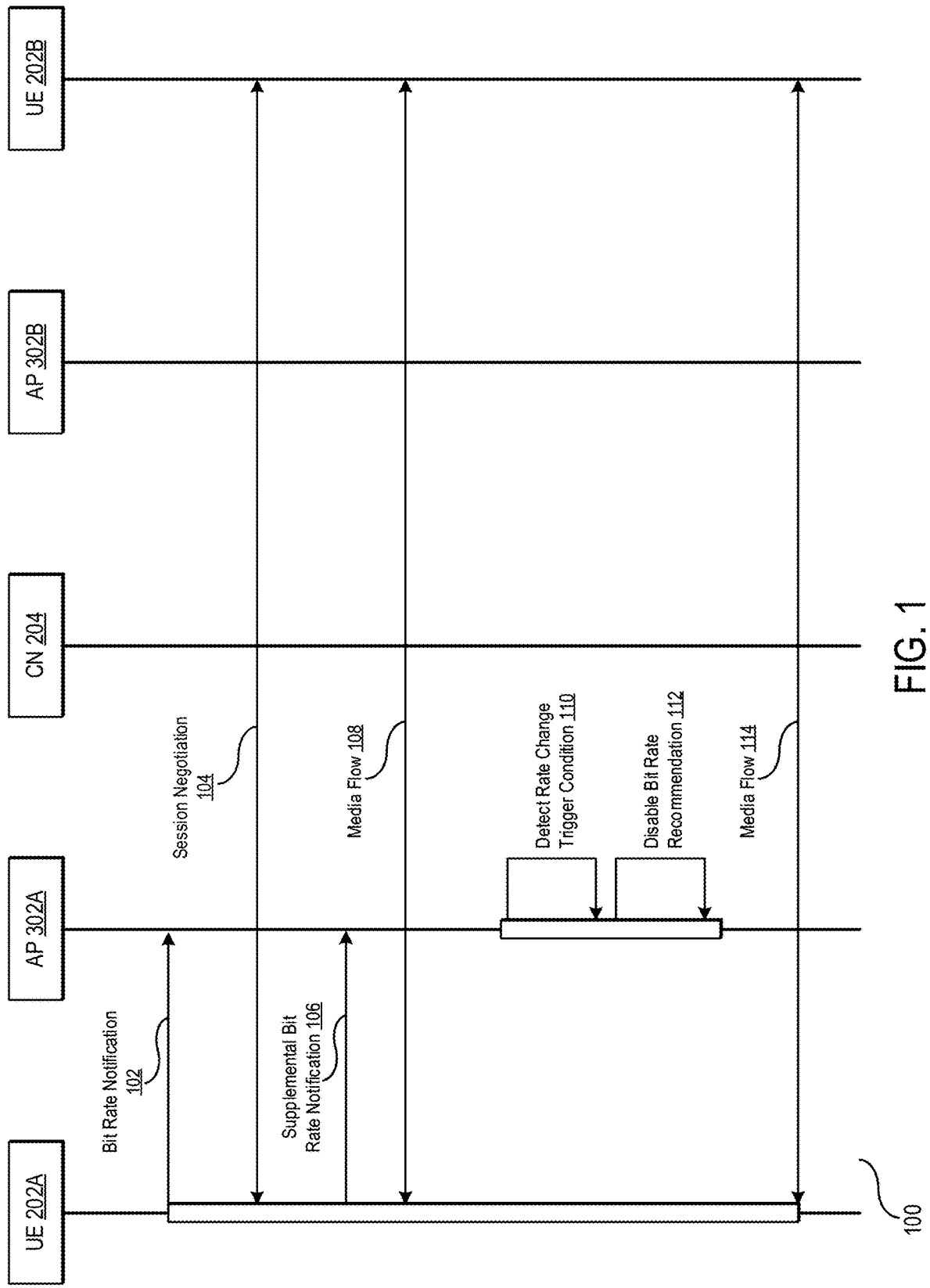
FIG. 1 is a call flow diagram illustrating a method for monitoring end-to-end media negotiations results according to some of the disclosed embodiments.

In current cellular networks, UE are unable to communicate the results of end-to-end media negotiation to a RAN. End-to-end session parameters that differ from the parameters used by the RAN can unintentionally waste the RAN resources. Mobile network operators suffer higher costs per bit and end-users experience performance degradation as a result.

For example, UEs that support Enhanced Voice Services (EVS) sessions support both fixed rate and rate adaptation modes. The network only communicates with a UE on its EVS capability at the beginning of a call setup. The EVS codec and mode negotiation between two end-to-end UEs during the call setup is dynamic and is transparent to the network. That is, the RAN has no knowledge of the UE's choice of the codec and mode for any call. Thus, the RAN will keep sending the bit rate change recommendations to the device, even when the UE cannot act upon the recommendation. If the UE is in a fixed rate mode, this recommendation is usually ignored by the UE, while the RAN continues to use and waste resources in transmission of the recommendations.

Thus, in current cellular networks, the RAN lacks bi-directional protection for RAN resources when, for example, an EVS codec rate adaptation feature is used. As a result, the RAN does not prevent the transmission of unnecessary bit rate recommendations (e.g., EVS bit rate recommendation) to the device in such scenario.

The disclosed embodiments provide a periodic notification system whereby UEs can self-report changed session parameters. In response, a RAN can adjust a recommendation scheme based on the changed session parameters. As a result, the RAN can conserve resources and avoid or modulate the transmission of recommendations that may be ignored by a UE.

More specifically, methods, computer-readable media, devices, and systems are disclosed that operate to receive (at, for example, an access point such as an eNodeB or gNodeB) a first notification from UE that includes data representing the capabilities of the UE (e.g., codec, bit rate mode, bit rate, etc.). While the session is active, the disclosed embodiments receive a second notification from the UE that includes data representing a negotiated session parameter. Independently, the disclosed embodiments may detect a change in quality of a network associated with the UE and upon such a detection may disable a transmission of a recommendation to the UE based on the negotiated session parameter.

In some embodiments, the capabilities of the UE include data representing Enhanced Voice Services (EVS) capabilities. In one embodiment, these capabilities include a supported bit rate mode of the UE, a target bit rate, a codec, etc. In some embodiments, the supported bit rate mode comprises a bit rate adaptation mode. Further, in some embodiments, the data representing a negotiated session parameter comprises a negotiated bit rate mode different from the supported bit rate mode. Further, in some embodiments, the negotiated bit rate mode comprises a fixed bit rate mode. Alternatively, or in conjunction with the foregoing, the disclosed embodiments may include receiving a third notification from the UE including data indicating a second negotiated session parameter. The disclosed embodiments may then enable transmission of the recommendation to the UE based on the second negotiated session parameter.

FIG. 1 is a call flow diagram illustrating a method (100) for monitoring end-to-end media negotiations results according to some of the disclosed embodiments.

In step 102, a first UE (202A) may transmit a bit rate notification to a first access point (302B). In one embodiment, the bit rate notification may comprise a message describing the capabilities of the first UE (202A). For example, the bit rate notification may comprise a message describing the EVS capabilities of the first UE (202A). In one embodiment, EVS capabilities may include, but are not limited to, an indication that the first UE (202A) supports a bit rate adaptation mode during an EVS session, an indication that the first UE (202A) supports a fixed bit rate mode, an indication that the first UE (202A) supports both a bit rate adaptation mode and a fixed bit rate mode, or a choice of codec encoding and decoding at a different bitrate and used between the first UE (202A) and second UE (202B). While EVS is presented as an example, the disclosed embodiments are not limited to EVS. Indeed, any communications that are negotiated end-to-end (i.e., directly between first UE 202A and second UE 202B) may be utilized. Specifically, the bit rate notification may comprise any notification that describes the capabilities of a given UE used in an end-to-end session negotiation.

In step 104, the first UE (202A) and second UE (202B) negotiate session parameters that represent which codec and range of the bit rate the communication is established.

In the illustrated embodiment, step 104 may comprise an EVS codec negotiation procedure. In one embodiment, the EVS codec negotiation procedure may comprise a Session Description Protocol (SDP) negotiation between the first UE (202A) and second UE (202B). The specific negotiation protocol used is not limiting, and EVS is used solely as an example.

Indeed, the negotiation in step 104 may comprise any end-to-end protocol whereby the first UE (202A) and second UE (202B) negotiate parameters that components of the core network (206) are unable to inspect. That is, the negotiation in step 104 may comprise any negotiation that occurs at a higher protocol layer than the core network (206) or access points (302A, 302B) operate.

For example, the first UE (202A) and second UE (202B) may negotiate in a Non-Access Stratum-Session Management (NAS-SM) or Non-Access Stratum Mobility Management (NAS-MM) layer bearer in a 5G network (and equivalent layers in other technologies). When the first UE (202A) and second UE (202B) communicate via NAS-SM to establish a session, the access points (302A, 302B) do not have access to the parameters exchanged in the NAS-SM or NAS-MM layer. That is, the data communicated between the first UE (202A) and the second UE (202B) is invisible to the access points (302A, 302B). Thus, a RAN including the access points (302A, 302B) continues to operate regardless of the parameters negotiated between the first UE (202A) and the second UE (202B).

In step 106, the first UE (202A) reports a supplemental bit rate notification. An example of one format of a supplemental bit rate notification is provided in FIG. 5, the description of which is not repeated herein. In one embodiment, the first UE (202A) generates the supplemental bit rate notification based on the results of the negotiation in step 104. For example, the first UE (202A) may include an indication of the change to a fixed bit rate mode in the supplemental bit rate notification. In one embodiment, the supplemental bit rate notification is transmitted in a control plane message.

In step 108, after the first UE (202A) reports the negotiated parameters, the first UE (202A) and second UE (202B) exchange media (e.g., voice, video, etc.) according to the parameters negotiated in step 104. The details of exchanging media content in step 108 may be performed using any codec, and no limitation is placed on the mechanics of exchanging media. As discussed, the examples herein utilize EVS media exchange but are not limited thereto. While bit rate modes in an EVS protocol are used as an example, the disclosed embodiments are not limited as such. Indeed, any parameters negotiated between the first UE (202A) and the second UE (202B) may be included in the notification of step 106.

As illustrated above, during step 104, the first UE (202A) and second UE (202B) may negotiate a parameter that differs from that reported by the first UE (202A) to the access point (302A) in step 102. For example, the first UE (202A) may report that it supports bit rate adaptation in step 102. However, during negotiations in step 104, the second UE (202B) may indicate it does not support bit rate adaptation. Thus, during the negotiation in step 104, the first UE (202A) and second UE (202B) may agree to utilize a fixed bit rate mode despite the first UE (202A) supporting bit rate adaptation. Thus, in previous systems, during media flow (step 108), the first UE (202A) and second UE (202B) utilize a fixed bit rate mode while the access point (302A) associates the first UE (202A) with a bit rate adaptation mode. However, as indicated in step 104, in the disclosed embodiments, the first UE (202A) may report its negotiation results to the access point (302A), and the access point (302A) may associate these results with the established session for the life of the session, or until a further supplemental bit rate notification is received.

In step 110, the access point (302A) detects a rate change trigger condition. In one embodiment, the access point (302A) continuously monitors the wireless link condition while the first UE (202A) is attached to the access point (302A). In existing systems, when an access point detects network congestion, it may transmit a message to the first UE (202A), informing the UE of such and instructing it to lower its bit rate. Conversely, if an access point detects that there is little network congestion, the access point may inform the first UE (202A) accordingly and instruct the UE to increase its bit rate. However, in existing systems, the access point would be unaware when the first UE (202A) and second UE (202B) are operating in a fixed bit rate mode. Thus, the first UE (202A) in this scenario would simply ignore the instruction to change its bit rate. Thus, the access point wastes resources generating messages and wastes wireless link capacity sending messages that are simply ignored by the receiver. In the illustrated embodiment, however, the access point (302A) further executes step 112 in response to detecting changes in wireless link conditions.

In step 112, the access point (302A) disables a bit rate recommendation. In the illustrated embodiment, after detecting a change in the wireless link conditions, the access point (302A) may determine if the first UE (202A) is operating in a fixed bit rate mode. In the illustrated embodiment, the access point (302A) makes this determination by determining if the first UE (202A) has transmitted a notification (step 106). If so, the access point (302A) will not transmit a bit rate change notification to the first UE (202A), thus conserving link capacity.

In step 114, the first UE (202A) and second UE (202B) may continue exchanging media as in step 108 according to the negotiated parameters. In the illustrated embodiment, steps 110 and 112 may be executed periodically during the exchange of media (e.g., steps 108 or 114) based on the conditions of a wireless link. Further, in some scenarios, step 106 may also be executed periodically if the session parameters between the first UE (202A) and second UE (202B) change. Thus, as an example, if the first UE (202A) and second UE (202B) change the session bit rate mode to bit rate adaptation, the access point (302A) may not execute step 112 in response to detecting a rate change trigger condition in step 110.

Figure 2:
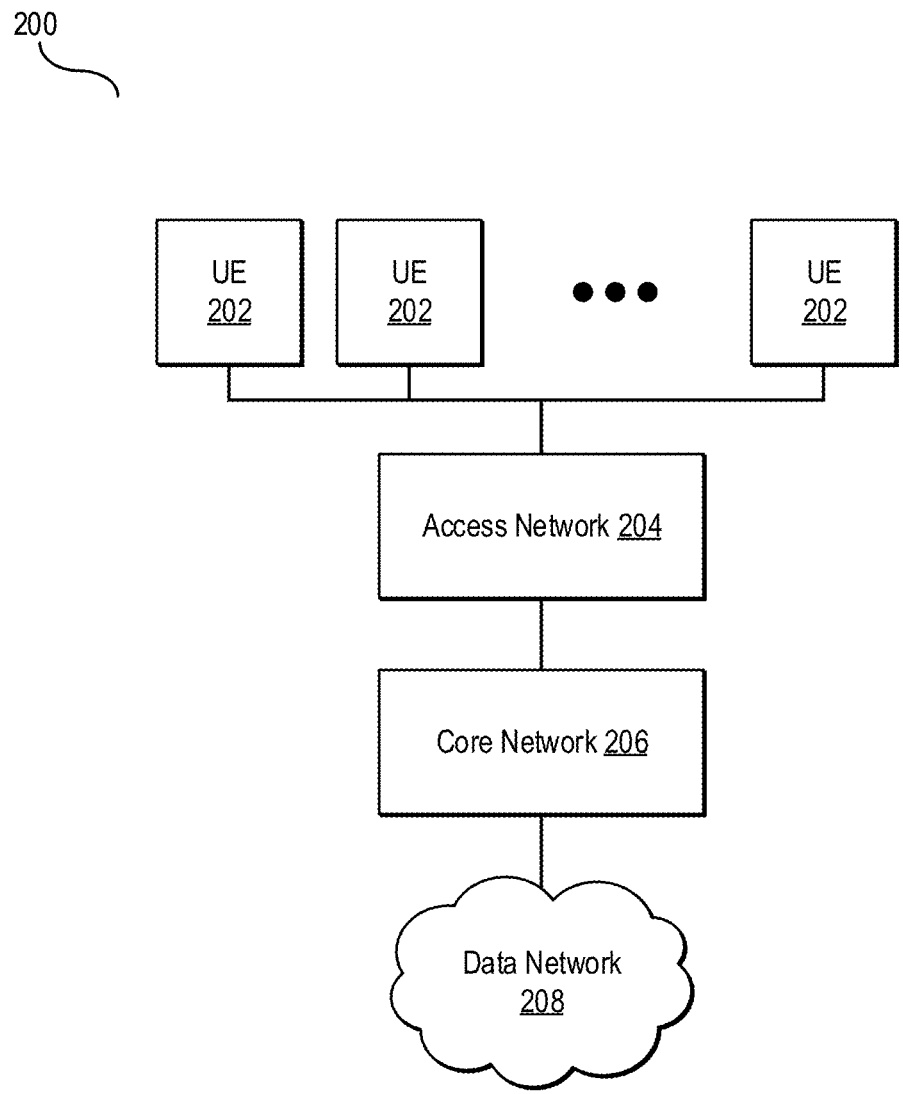
FIG. 2 is a block diagram of a cellular network according to some embodiments of the disclosure.

FIG. 2 is a block diagram of a cellular network according to some embodiments of the disclosure.

In the illustrated embodiment, a system (200) includes UE (202) that accesses a data network (208) via an access network (204) and a core network (206). In the illustrated embodiment, UE (202) comprises any computing device capable of communicating with the access network (204). As examples, UE (202) may include mobile phones, tablets, laptops, sensors, Internet of Things (IoT) devices, and any other devices equipped with a cellular transceiver. One example of a UE is provided in FIG. 7.

In the illustrated embodiment, the access network (204) comprises a network allowing over-the-air network communication with UE (202). In general, the access network (204) includes at least one base station that is communicatively coupled to the core network (206) and wirelessly coupled to zero or more UE (202).

In one embodiment, the access network (204) comprises a fifth-generation (5G) cellular access network. In one embodiment, the access network (204) and UE (202) comprise a NextGen Radio Access Network (NG-RAN). In an embodiment, the access network (204) includes a plurality of next Generation Node B (gNodeB) base stations connected to UE (202) via an air interface. In one embodiment, the air interface comprises a New Radio (NR) air interface. In some embodiments, an NR interface utilizes a cyclic prefix orthogonal frequency-division multiple access (CP-OFDM) downlink modulation scheme and either CP-OFDM or discrete Fourier transform spread orthogonal frequency division multiplexing (DFT-s-OFDM) uplink modulation scheme. In these embodiments, the gNodeB provides all functionality to implement and operate the air interface and negotiates uplinks and downlinks with the UE (202). The gNodeB may additionally include multiple network interfaces for communicating with the core network (206). In one embodiment, the gNodeB includes an interface to communicate with a mobility manager (e.g., an AMF) and a second interface to communicate with one or more gateway elements in the core network (206) such as a Session Management Function (SMF) for control data or a User Plane Function (UPF) for user data. In one embodiment, the mobility manager manages control plane traffic while the gateway elements manage user data traffic, as will be discussed. In some embodiments, base stations in the access network (204) are communicatively connected. For example, in a 5G network, individual gNodeB devices can be communicatively coupled via an X2 interface.

In one embodiment, the access network (204) comprises a fourth-generation (4G) cellular access network. In some embodiments, the access network (204) comprises an LTE access network. In one embodiment, the access network (204) and UE (202) comprise an Evolved Universal Mobile Telecommunications System (UMTS) Terrestrial Radio Access Network (E-UTRAN). In an embodiment, the access network (204) includes a plurality of Evolved Node B (eNodeB) base stations connected to UE (202) via an air interface. In one embodiment, the air interface comprises an E-UTRAN Uu or LTE Uu radio air interface. In some embodiments, an E-UTRAN Uu interface utilizes an orthogonal frequency-division multiple access (OFDMA) downlink modulation scheme and a single-carrier frequency-division multiple access (SC-FDMA) uplink modulation scheme. In these embodiments, the eNodeB provides all functionality to implement and operate the air interface and negotiates uplinks and downlinks with the UE (202). The eNodeB may additionally include multiple network interfaces for communicating with the core network (206). In one embodiment, the eNodeB includes an interface to communicate with a mobility manager (e.g., a Mobility Management Entity, MME) and a second interface to communicate with one or more gateway elements in the core network (206) such as a Serving Gateway (S-GW) or Packet Data Network Gateway (P-GW). In one embodiment, the mobility manager manages control plane traffic while the gateway elements manage user data traffic, as will be discussed. In some embodiments, base stations in the access network (204) are communicatively connected. For example, in a 4G network, individual eNodeB devices can be communicatively coupled, for example via an X2 interface or any other interface.

In some embodiments, the access network (204) may operate in a dual-connectivity mode wherein a single UE (202) connects to multiple base stations in the access network (204) simultaneously. In some embodiments, dual connectivity may be implemented via New Radio Dual Connectivity (NR-DR), E-UTRA—NR Dual Connectivity (EN-DC), NG-RAN—E-UTRA-NR Dual Connectivity (NGEN-DC), or NR—E-UTRA Dual Connectivity (NE-DC).

In the illustrated embodiment, the access network (204) provides access to a core network (206) to the UE (202). In the illustrated embodiment, the core network may be owned and/or operated by a mobile network operator (MNO) and provides wireless connectivity to UE (202). In the illustrated embodiment, this connectivity may comprise voice and data services. The core network (206) includes various computing devices, which are described briefly herein. Further detail of such devices is provided in FIG. 3.

At a high-level, the core network (206) may include a user plane and a control plane. In one embodiment, the control plane comprises network elements and communications interfaces to allow for the management of user connections and sessions. By contrast, the user plane may comprise network elements and communications interfaces to transmit user data from UE (202) to elements of the core network (206) and to external network-attached elements in a data network (208) such as the Internet. An example of a control plane function comprises authenticating that a user can access the core network (206) (i.e., is a subscriber to the MNO). An example of a user plane function is the request and receipt of data from an external web server (e.g., via a web browser on a UE). Many other examples exist in a 4G or 5G network, and the foregoing examples are not intended to be limiting.

Generally, the core network (206) may include a mobility manager, one or more gateways (e.g., a serving gateway and packet gateway), and a subscriber database. In practice, the core network (206) may include more components than these. In a 4G network, the mobility manager may be implemented by an MME, the serving gateway by an S-GW, the packet gateway by a P-GW, and the subscriber database by a home subscriber server (HSS). In a 5G network, the mobility manager may be implemented by an AMF, SMF, and an Authentication Server Function (AUSF). Specifically, the AMF performs mobility management while the SMF performs session management, both of which are described herein. Further, the AUSF obtains authentication vectors from a subscriber database. In a 4G network, the MME performs all of these functions. The serving gateway in a 5G network may be implemented by the SMF as well. Specifically, packet routing from the base station to the packet gateway may be handled by the SMF in contrast to the S-GW in a 4G network. In a 5G network, the packet gateway may be implemented by the UPF, which provides packet routing from the serving gateway to external services and manages Internet Protocol (IP) address allocation as well as content filtering and blocking. In a 5G network, the subscriber database may be implemented by a Unified Data Repository (UDR), which stores the subscriber data. Access to the UDR may be mediated by Unified Data Management (UDM), which is part of the subscriber database, as described herein.

In brief, a UE (202) communicates with the mobility manager to authenticate and establish a session or bearer with the serving and packet gateways. The mobility manager accesses the subscriber data to confirm the UE (202) identity and communicates with the serving gateway to establish the session. Once established, the UE (202) transmits data requests through the session to the packet gateway, which manages the transmitting and receiving data to and from external network services. Specific details of these elements are provided in the following figures.

In the illustrated embodiment, the access network (204) and the core network (206) are operated by an MNO. However, in some embodiments, the networks (104, 106) may be operated by a private entity and may be closed to public traffic. For example, the components of the network (206) may be provided as a single device, and the access network (204) may comprise a small form-factor base station. In these embodiments, the operator of the device can simulate a cellular network, and UE (202) can connect to this network similar to connecting to a national or regional network.

Figure 3:
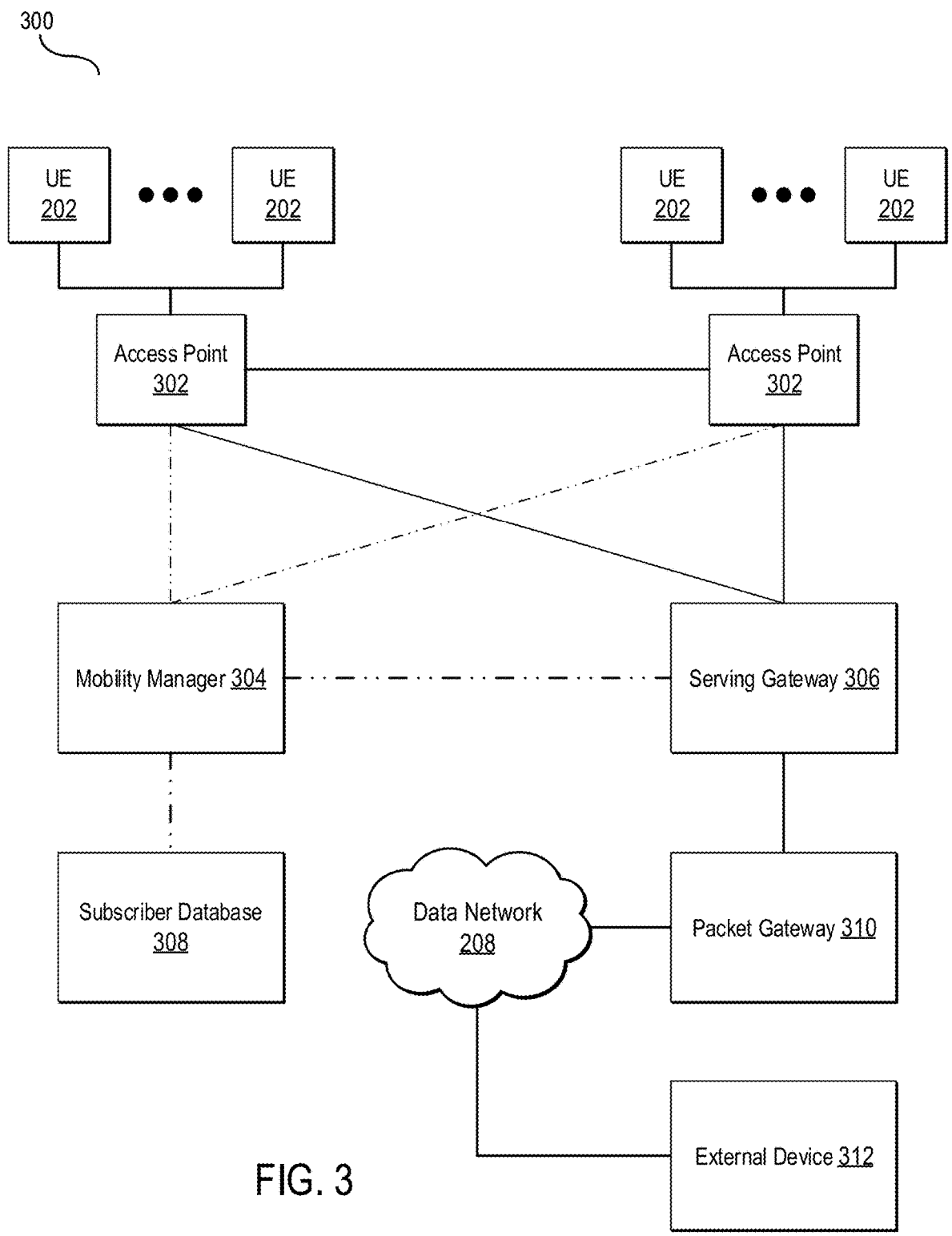
FIG. 3 is a block diagram illustrating a cellular network according to some embodiments of the disclosure.

FIG. 3 is a block diagram illustrating a cellular network according to some embodiments of the disclosure.

In the illustrated embodiment, a system (300) includes UE (202) communicatively connected to access points (302). As seen in FIG. 2, the access points (302) form an access network such as a network (204). In one embodiment, the access points (302) and UE (202) comprise a NextGen Radio Access Network (NG-RAN). In an embodiment, the access points (302) comprise a plurality of gNodeB base stations connected to UE (202) via an air interface. In one embodiment, the air interface comprises a New Radio (NR) air interface. In some embodiments, an NR interface utilizes a cyclic prefix orthogonal frequency-division multiple access (CP-OFDM) downlink modulation scheme and either CP-OFDM or discrete Fourier transform spread orthogonal frequency division multiplexing (DFT-s-OFDM) uplink modulation scheme. In these embodiments, the gNodeB provides all functionality to implement and operate the air interface and negotiates uplinks and downlinks with the UE (202). The gNodeB additionally includes multiple network interfaces for communicating with the core network and, specifically, mobility manager (304) and serving gateway (306). In one embodiment, the mobility manager (304) in a 5G network comprises an AMF. In one embodiment, the serving gateway (306) comprises an SMF for control data or UPF for user data.

In another embodiment, the access points (302) comprise eNodeB base stations connected to UE (202) via an air interface. embodiment, the air interface comprises an E-UTRAN Uu or LTE Uu radio air interface. In some embodiments, an E-UTRAN Uu interface utilizes an orthogonal frequency-division multiple access (OFDM) downlink modulation scheme and a single-carrier frequency-division multiple access (SC-FDM) uplink modulation scheme. In these embodiments, the eNodeB provides all functionality to implement and operate the air interface and negotiates uplinks and downlinks with the UE (202). The eNodeB additionally includes multiple network interfaces for communicating with the core network and, specifically, mobility manager (304) and serving gateway (306). In one embodiment, the mobility manager (304) comprises an MME in a 4G network. In the illustrated embodiment, solid lines between network elements (304, 306, 308, and 310) represent user data traffic while dashed lines between network elements (304, 306, 308, and 310) represent control or non-access stratum (NAS) traffic.

In the illustrated embodiment, the mobility manager (304) manages control plane traffic while the gateway elements (306, 310) manage user data traffic. Specifically, the mobility manager (304) may comprise hardware or software for handling network attachment requests from UE (202). As part of processing these requests, the mobility manager (304) accesses a subscriber database (308). The subscriber database (308) comprises hardware or software that stores user authorization and authentication data and validates users to the network. In some embodiments, the subscriber database (308) may comprise a UDM and UDR in a 5G network. In another embodiment, the subscriber database (308) may comprise an HSS in a 4G network. In one embodiment, the subscriber database (308) may also store a location of the user updated via a Diameter or similar protocol.

The mobility manager (304) may also be configured to create data sessions or bearers between UE (202) and serving gateway (306) or packet gateway (310). In one embodiment, the serving gateway (306) and packet gateway (310) may comprise single or separate devices. In general, the serving gateway (306) routes and forwards user data packets while also acting as the mobility anchor for the user plane during access point handovers and as the anchor for mobility between different network technologies. For idle state UE (202), the serving gateway (306) terminates the downlink data path and triggers paging when downlink data arrives for the UE (202). The serving gateway (306) manages and stores UE (202) contexts, e.g., parameters of the IP bearer service, network internal routing information. In a 5G network, the serving gateway (306) may be implemented by an SMF. In a 4G network, the serving gateway (306) may be implemented by an S-GW.

The serving gateway (306) is communicatively coupled to a packet gateway (310). In general, the packet gateway (310) provides connectivity from the UE (202) to external packet data networks (PDNs) such as data network (208) by being the point of exit and entry of traffic to external networks (e.g., 208). UE (202) may have simultaneous connectivity with more than one packet gateway (310) for accessing multiple packet data networks. The packet gateway (310) performs policy enforcement, packet filtering for each user, charging support, lawful interception, and packet screening. In the illustrated embodiment, the packet gateway (310) also limits access to endpoints such as external device (312). In a 5G network, the packet gateway (310) may be implemented by a UPF. In a 4G network, the packet gateway (310) may be implemented by a P-GW.

In the illustrated embodiment, an external device (312) is communicatively coupled to the core network via the data network (208). In one embodiment, the data network (208) may comprise the Internet. In the illustrated embodiment, the external device (312) may comprise any electronic device capable of communicating with the data network (208) and the disclosure is not limited to specific types of network devices.

As discussed, in some embodiments, UE (202) may alternatively connect to multiple access points (302) in a dual-connectivity arrangement. In this embodiment, such a UE (202) will have multiple data paths through the core network and control and user plane separation (CUPS) may be used to route control and user data traffic.

Figure 4:
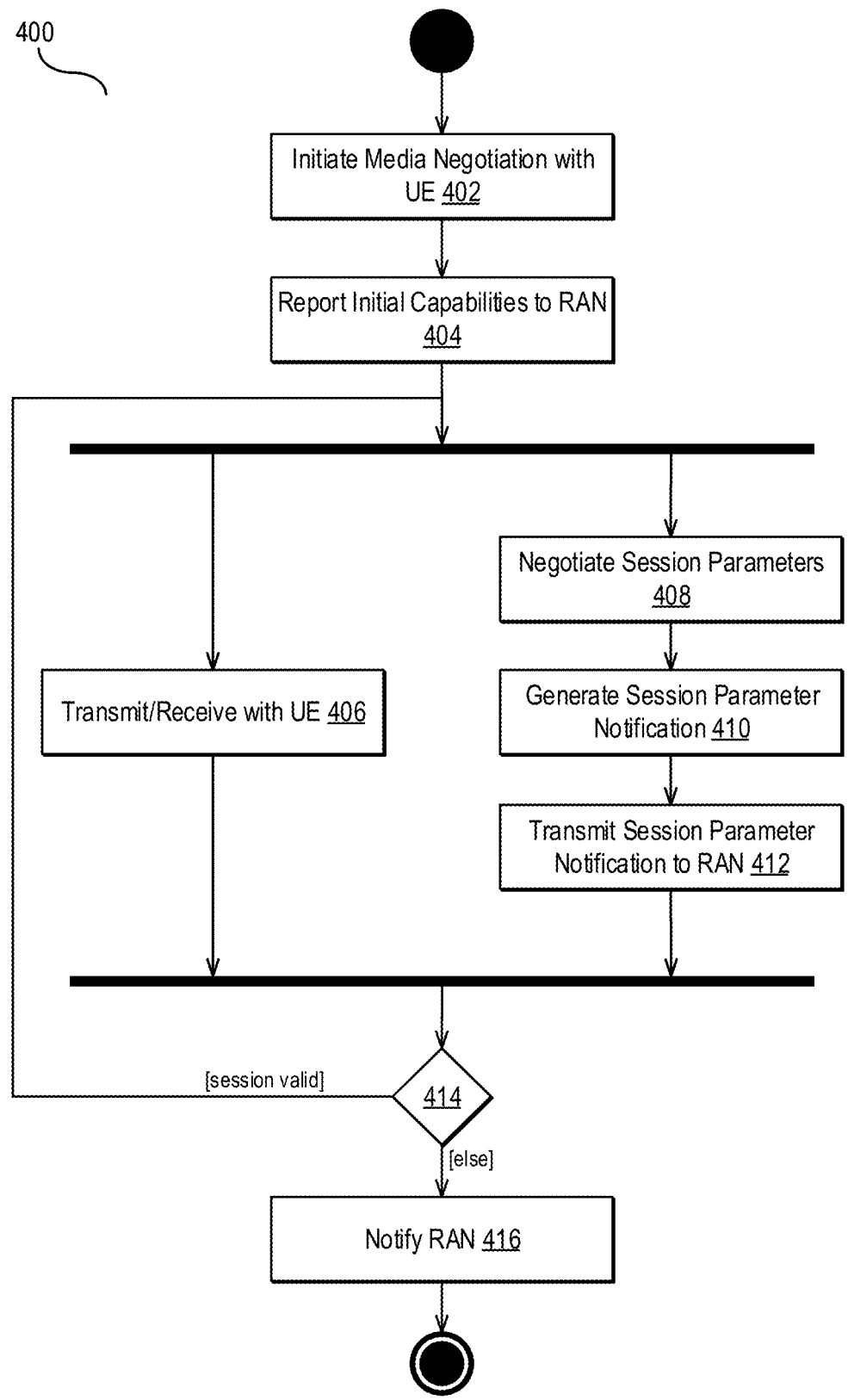
FIG. 4 is a flow diagram illustrating a method for generating a supplemental bit rate notification according to some of the disclosed embodiments.

FIG. 4 is a flow diagram illustrating a method (400) for generating a supplemental bit rate notification according to some of the disclosed embodiments. In some embodiments, the method (400) may be executed by UE in a cellular network.

In step 402, the method (400) may comprise initiating media negotiation with a second UE. In one embodiment, the media negotiation may comprise initiating an EVS or Real-Time Protocol (RTP) session.

In step 404, the method (400) may comprise reporting the initial capabilities of the UE to the RAN. In one embodiment, the first UE includes a set of capabilities available for the session initiated in step 402. For example, the first UE may support multiple bit rate modes useable during the session. Examples of bit rate modes include bit rate adaptation modes and fixed bit rate modes. In one embodiment, in step 404, the first UE reports all capabilities it supports. In another embodiment, the first UE reports its preferred capabilities. For example, if the first UE supports both fixed-rate and adaptation bit rate modes, the UE may report its bit rate adaptation mode capabilities to the RAN.

As illustrated, steps 406 and steps 408 through 412 may be executed in parallel. In some embodiments, steps 408 and 412 may be executed first, and then steps 406 and steps 408 through 412 may be executed periodically, as depicted in FIG. 3.

In step 408, the method (400) may comprise negotiating session parameters with the second UE. In one embodiment, step 408 may comprise performing an SDP codec negotiation with the second UE. In one embodiment, a first UE may negotiate the parameters of a session with the second UE. For example, the first UE may provide its capabilities to the second UE, and the second UE may respond with its corresponding capabilities. Based on these two sets of capabilities, both UEs may determine the best capabilities available for the session. The best capabilities may be used as the communication mode of the session for future communications (e.g., step 406). As indicated in the illustrated embodiment, the method (400) may periodically re-negotiate session parameters during the session and thus may execute step 408 (and steps 410 and 412) periodically throughout the life of the session.

In the illustrated embodiment, the negotiated capabilities may differ from the capabilities reported to the RAN in step 404. For example, in step 404, the first UE may report to the RAN that it uses bit-rate adaptation. However, during negotiations in step 408, the first UE and second UE may agree to use a fixed bit rate mode. Thus, at the conclusion of step 408, the first UE and second UE are using a capability different from that initially reported to the RAN.

In step 410, the method (400) may comprise generating a session parameter notification. In one embodiment, the method (400) may comprise generating a Medium Access Control (MAC) control element (CE) that includes the session parameter negotiated in step 408. In one embodiment, the MAC CE may include current EVS mode (e.g., fixed rate or a range of rate adaptation) after negotiation in step 408 completes. In one embodiment, the MAC CE includes a Recommended Bit Rate MAC CE LCID value and a reserved field for its EVS mode. Exemplary details of a Recommended Bit Rate MAC CE are provided in more detail in the description of FIG. 5.

Figure 5:
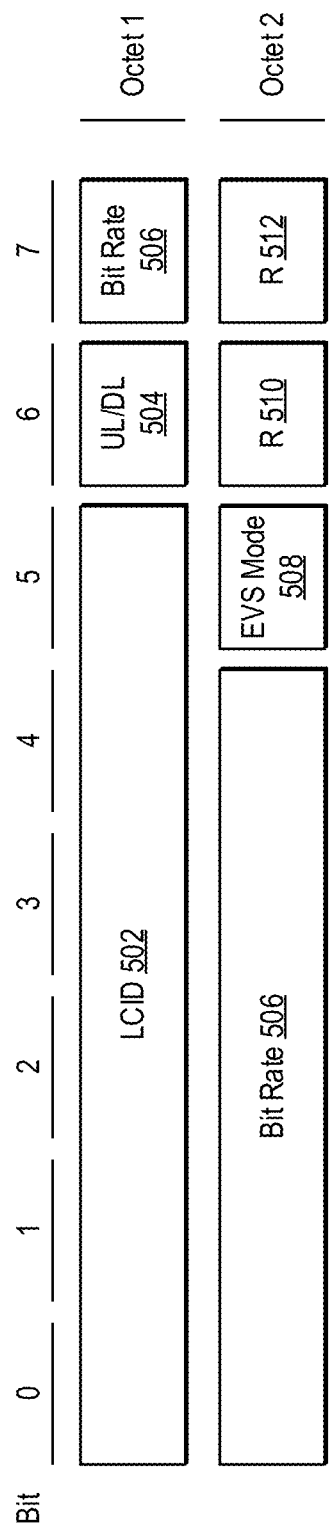
FIG. 5 is a packet diagram of a MAC control element according to some of the disclosed embodiments.

In step 412, the method (400) may comprise transmitting the session parameter notification to the RAN. In the illustrated embodiment, the method (400) may comprise transmitting the MAC CE generated in step 410 to an access point (e.g., an eNodeB or gNodeB). In one embodiment, the first UE may transmit the session parameter notification. However, in other embodiments, the second UE may transmit the session parameter notification. In some embodiments, both the first UE and second UE may transmit the session parameter notification. In one embodiment, the RAN may distribute the session parameter notification to access points other than the access point(s) that received the session parameter notification via an X2 interface. In one embodiment, the supplemental bit rate notification is transmitted in a control plane message. In the illustrated embodiment, the session parameter notification may be transmitted as a MAC CE using existing control protocols implemented between the RAN and UE. For example, as illustrated in FIG. 5, the session parameter notification may comprise a MAC CE with a specific LCID value to indicate the type of CE.

In step 406, the method (400) may comprise transmitting data to a second UE and receiving data from the second UE. In the illustrated embodiment, the first UE and second UE communicate using the session negotiated in step 408. In one embodiment, the session comprises an RTP session. Details of communicating via a session are not provided herein, and any type of session may be used.

In step 414, the method (400) may comprise determining if the session is still valid. If so, the method (400) may continue to execute steps 406, 408, 412, and 414 throughout the lifetime of the session. However, upon detecting that the session is completed, the method (400) may execute step 416.

In step 416, the method (400) may comprise notifying the RAN that the session is over upon determining as such. In one embodiment, the first UE, second UE, or both UEs transmit a notification to the RAN indicating that the session is complete. In response, the RAN may remove a record of the session capabilities of the session.

FIG. 5 is a packet diagram of a MAC control element according to some of the disclosed embodiments.

In the illustrated embodiment, a MAC CE (500) includes two eight-bit octets (labeled 1 and 2). Although the illustrated embodiment comprises a MAC CE, other packet formats may be used, and the use of a MAC CE is presented as an example. In some embodiments, the MAC CE (500) may comprise the session parameter notification generated in step 410 of FIG. 4.

In the illustrated embodiment, the MAC CE (500) includes a six-bit (Logical Channel Identifier (LCID)) field (502), a one-bit upload/download (UL/DL) field (504), a six-bit bit rate field (506), a one-bit EVS mode field (508) and two one-bit reserved fields (510, 512).

In the illustrated embodiment, the LCID field (502) may define characteristics or the destination of the MAC data. For example, it tells whether the MAC data is for control or user data, or for signaling message etc. In the illustrated embodiment, the LCID field (502) may be set to a preconfigured value such as a Recommended Bit Rate LCID value (e.g., 101111). Other LCID values may be used.

In the illustrated embodiment, the MAC CE (500) includes a UL/DL field (504). The UL/DL field (504) may indicate whether the recommended bit rate or the recommended bit rate query applies to uplink or downlink. In one embodiment, a value of "0" indicates downlink, while a value of "1" indicates uplink. In the illustrated embodiment, the value of the UL/DL field (504) may be set to "1" when transmitting the session parameters.

In the illustrated embodiment, the MAC CE (500) includes a bit rate field (506). In some embodiments, the bit rate field (506) indicates the recommended or desired bit rate. In one embodiment, the bit rate field (506) represents the recommended bit rate determined based on the session negotiation. In some embodiments, the value of the bit rate field (506) may comprise an index value used to query a table of indexed bit rate values. Thus, a value of "1" in the bit rate field (506) may map to a bit rate of 0 kbit/s, a value of "2" in the bit rate field (506) may map to a bit rate of 9 kbit/s, and so on.

In existing systems, bits (508, 510, 512) may all be reserved and set to zero. However, in the illustrated embodiment, at least one bit (508) may be used to indicate the EVS mode. In one embodiment, the value of the bit (0 or 1) may be used to indicate bit rate adaptation mode or fixed bit rate mode. For example, a value of zero may indicate a fixed bit rate mode while a value of one may indicate a bit rate adaptation mode, and vice versa. In the illustrated embodiment, the bit fields (510, 512) may remain reserved and set to zero.

Figure 6:
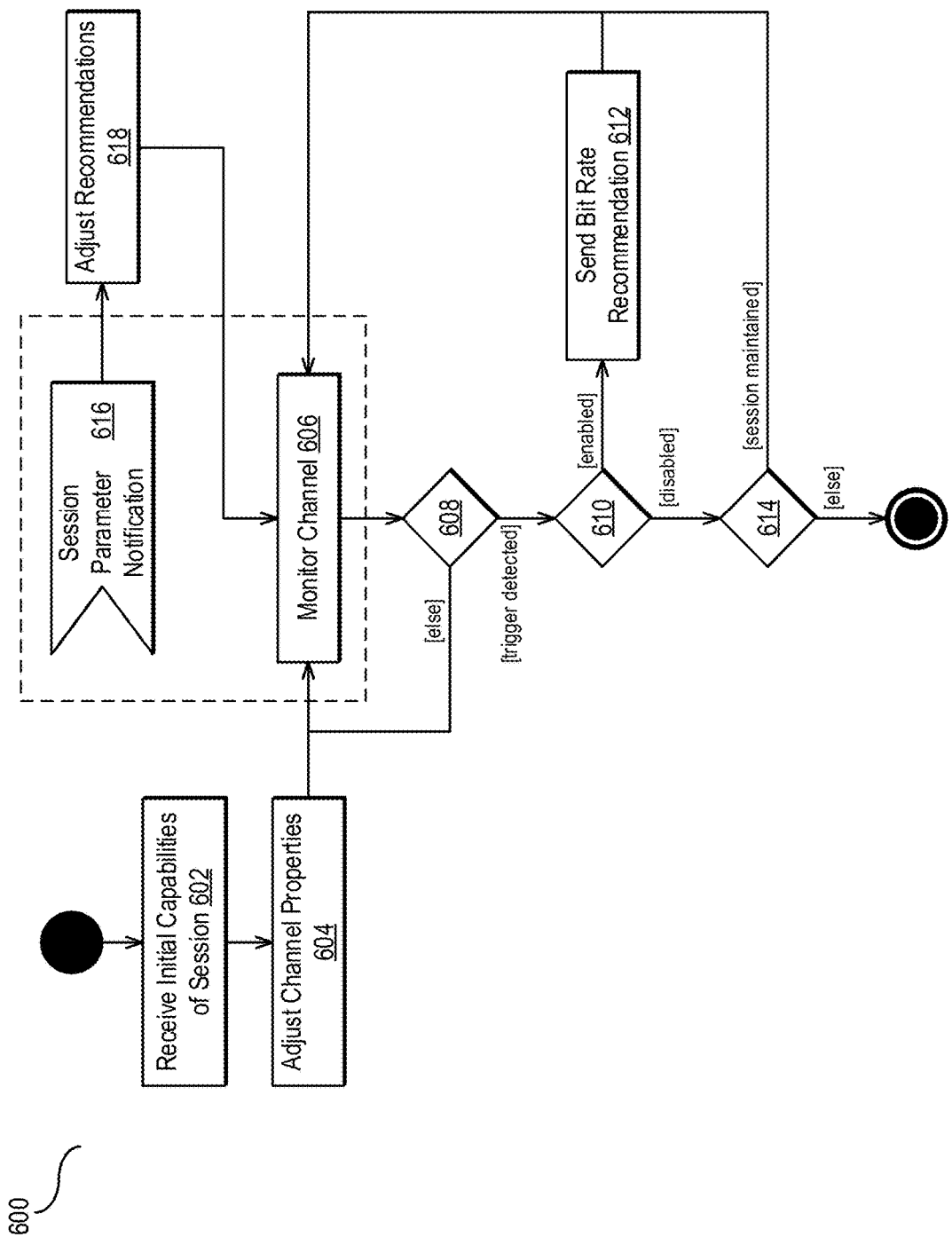
FIG. 6 is a flow diagram illustrating a method for determining whether to send a bit rate recommendation in some of the disclosed embodiments.

FIG. 6 is a flow diagram illustrating a method (600) for determining whether to send a bit rate recommendation in some of the disclosed embodiments. In the illustrated embodiment, the method (600) may be executed by a device in a RAN such as an eNodeB or gNodeB.

In step 602, the method (600) may include receiving the initial capabilities of a UE via a first notification. In the illustrated embodiment, the method (600) receives the initial capabilities from a UE participating in a communications session (e.g., an EVS session). In the illustrated embodiment, the initial capabilities may correspond to the capabilities sent in step 404 of FIG. 4, the disclosure of which is not repeated. As an example, the initial capabilities may comprise an EVS capability, such as a bit rate adaption mode enabled signal.

In step 604, the method (600) may include adjusting the channel properties for the communication session. In the illustrated embodiment, the method (600) may adjust any necessary property based on the initial capabilities, and no limit is placed on the type of adjustments needed. For example, the method (600) may adjust resource scheduling for the UE transmitting the initial capabilities to ensure that the requested bit rate (or another capability) can be met.

In step 606, the method (600) may monitor the channel or link establishing the communications session. In one embodiment, the method (600) may monitor the channel quality (e.g., using link adaptation) to determine how congested the link and overall radio access network is at any given moment. The method (600) may execute any technique to determine whether the requested capabilities (e.g., bit rate) are able to be met by the link or channel. A network condition that results in a change of a session capability (e.g., a bit rate adjustment) is referred to as a trigger.

In step 608, the method (600) may determine if such a trigger has occurred. If not, the method (600) continues to monitor the link/channel in step 606. As an example, the method (600) may determine that too many UEs are attaching to the network and that all UEs should reduce their bit rates to prevent dropping connections.

As illustrated in FIG. 6, while monitoring the channel in step 608, the method (600) may receive a session parameter notification (step 616) in an interruptible fashion. That is, the method (600) may receive the notification at any point after receiving the initial capabilities in step 602. Indeed, in some embodiments, the method (600) may receive the notification multiple times while monitoring the channel. The session parameter notification received in step 616 may comprise a MAC CE such as that described in connection with FIG. 5, the disclosure of which is not repeated.

In the illustrated embodiment, the session parameter notification includes data representing a negotiated session parameter. As discussed in FIGS. 3 through 5, this negotiated session parameter may comprise an EVS mode, a bit rate, a codec, or other parameters negotiated between UEs during a session setup.

In step 618, the method (600) may comprise adjusting recommendations based on the session parameter notification. As discussed above and herein, the method (600) may periodically send recommendations (e.g., MAC CE bit rate recommendations) to UE based on monitored channel conditions. For example, the method (600) may, by default, instruct UEs to lower their bit rates when congestion is detected. However, if the session parameter received in step 616 indicates that UEs are operating in a fixed bit rate mode, the UEs will ignore a bit rate change recommendation.

In one embodiment, the method (600) stores recommendation settings for each link. Thus, in one embodiment, the method (600) may extract a link identifier from the session parameter and update a recommendation setting for the link associated with the UE that sent the session parameter notification. In one embodiment, the method (600) may associate an EVS mode (or similar capability) in a table for each link identifier. As will be discussed, when detecting a network condition trigger, the method (600) will query the table to determine if a recommendation should be sent.

As illustrated, the method (600) may continue to monitor the channel after updating the recommendation settings (step 606) until detecting a trigger (step 608).

In step 610, after the method (600) detects a trigger, it determines whether recommendations are enabled. In the illustrated embodiment, the method (600) queries a table mapping links to recommendation settings and determines if recommendations are enabled or disabled. In some embodiments, recommendations will be enabled by default and only disabled explicitly in step 618.

If the method (600) determines that recommendations are disabled, the method (600) disables transmission of a recommendation to the UE based on the negotiated session parameter and proceeds directly to step 614. For example, if the UE indicated that it is operating in a fixed bit rate mode, the method (600) will disable sending a bit rate recommendation to the UE. Conversely, if the UE has indicated it is operating in a bit rate adaptation mode (step 602) and has not indicated a change contrary, the method (600) may generate and send a recommendation in step 612. In one embodiment, this recommendation may comprise a recommended bit rate MAC CE that includes a recommended bit rate change.

Although primarily described as disabling or enabling a recommendation, in some embodiments, the method (600) may adjust the recommendations. For example, in some embodiments, the method (600) may reduce the frequency in which recommendations are sent to the UE. In other cases, the method (600) may reduce the differential between current and recommended channel capabilities. For example, by default, a recommendation may be to reduce a bit rate by 50%. In some embodiments, the method (600) may modify this recommendation to reduce the bit rate by only 25%. In some embodiments, alternative percentage reductions or increases are contemplated herein.

Further, in some embodiments, the method (600) may adjust the recommendation for other links. For example, if one link indicates that it will not accept recommendations (e.g., is operating in fixed bit rate mode), the method (600) may increase the reduction in bit rates of those devices operating in a rate adaptation mode, thereby achieving the same overall reduction in congestion, equal to if each link was reduced.

Finally, in step 614, after sending a recommendation or disabling the transmission of a recommendation will determine if the session is still valid. If so, the method continuously executes the foregoing method until the session is terminated.

Figure 7:
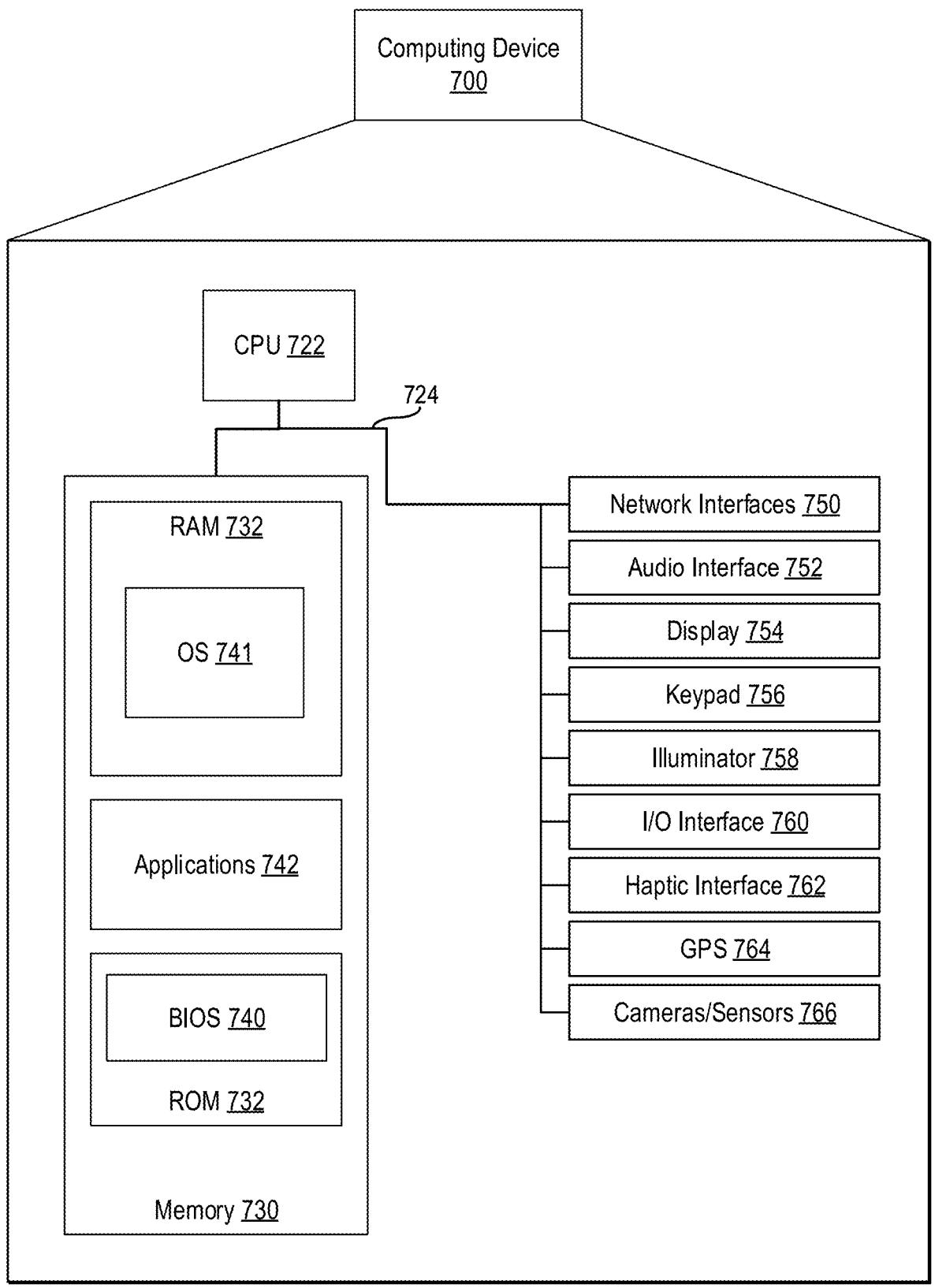
FIG. 7 is a block diagram illustrating a computing device showing an example of a client or server device used in the various embodiments of the disclosure.

FIG. 7 is a block diagram illustrating a computing device showing an example of a client or server device used in the various embodiments of the disclosure.

The computing device (700) may include more or fewer components than those shown in FIG. 7, depending on the deployment or usage of the device (700). For example, a server computing device, such as a rack-mounted server, may not include an audio interface (752), display (754), keypad (756), illuminator (758), haptic interface (762), Global Positioning Service (GPS) receiver (764), or cameras/sensor (766). Some devices may include additional components not shown, such as graphics processing unit (GPU) devices, cryptographic co-processors, artificial intelligence (AI) accelerators, or other peripheral devices.

As shown in the figure, the device (700) includes a central processing unit (CPU) (722) in communication with a mass memory (730) via a bus (724). The computing device (700) also includes one or more network interfaces (750), an audio interface (752), a display (754), a keypad (756), an illuminator (758), an input/output interface (760), a haptic interface (762), an optional global positioning systems (GPS) receiver (764) and a camera(s) or other optical, thermal, or electromagnetic sensors (766). Device (700) can include one camera/sensor (766) or a plurality of cameras/sensors (766). The positioning of the camera(s)/sensor(s) (766) on the device (700) can change per device (700) model, per device (700) capabilities, and the like, or some combination thereof.

In some embodiments, the CPU (722) may comprise a general-purpose CPU. The CPU (722) may comprise a single-core or multiple-core CPU. The CPU (722) may comprise a system-on-a-chip (SoC) or a similar embedded system. In some embodiments, a GPU may be used in place of, or in combination with, a CPU (722). Mass memory (730) may comprise a dynamic random-access memory (DRAM) device, a static random-access memory device (SRAM), or a Flash (e.g., NAND Flash) memory device. In some embodiments, mass memory (730) may comprise a combination of such memory types. In one embodiment, the bus (724) may comprise a Peripheral Component Interconnect Express (PCIe) bus. In some embodiments, the bus (724) may comprise multiple busses instead of a single bus.

Mass memory (730) illustrates another example of computer storage media for the storage of information such as computer-readable instructions, data structures, program modules, or other data. Mass memory (730) stores a basic input/output system ("BIOS") (740) for controlling the low-level operation of the computing device (700). The mass memory also stores an operating system (741) for controlling the operation of the computing device (700)

Applications (742) may include computer-executable instructions which, when executed by the computing device (700), perform any of the methods (or portions of the methods) described previously in the description of the preceding Figures. In some embodiments, the software or programs implementing the method embodiments can be read from a hard disk drive (not illustrated) and temporarily stored in RAM (732) by CPU (722). CPU (722) may then read the software or data from RAM (732), process them, and store them to RAM (732) again.

The computing device (700) may optionally communicate with a base station (not shown) or directly with another computing device. Network interface (750) is sometimes known as a transceiver, transceiving device, or network interface card (NIC).

The audio interface (752) produces and receives audio signals such as the sound of a human voice. For example, the audio interface (752) may be coupled to a speaker and microphone (not shown) to enable telecommunication with others or generate an audio acknowledgment for some action. Display (754) may be a liquid crystal display (LCD), gas plasma, light-emitting diode (LED), or any other type of display used with a computing device. Display (754) may also include a touch-sensitive screen arranged to receive input from an object such as a stylus or a digit from a human hand.

Keypad (756) may comprise any input device arranged to receive input from a user. Illuminator (758) may provide a status indication or provide light.

The computing device (700) also comprises an input/output interface (760) for communicating with external devices, using communication technologies, such as USB, infrared, Bluetooth™, or the like. The haptic interface (762) provides tactile feedback to a user of the client device.

The optional GPS receiver (764) can determine the physical coordinates of the computing device (700) on the surface of the Earth, which typically outputs a location as latitude and longitude values. GPS receiver (764) can also employ other geo-positioning mechanisms, including, but not limited to, triangulation, assisted GPS (AGPS), E-OTD, CI, SAI, ETA, BSS, or the like, to further determine the physical location of the computing device (700) on the surface of the Earth. In one embodiment, however, the computing device (700) may communicate through other components, provide other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:
   receiving, at an access point, a first notification from user equipment (UE), the first notification including data representing a capability of the UE;
   receiving, at the access point, a second notification from the UE, the second notification including data representing a negotiated session parameter;
   detecting, by the access point, a change in quality of a network link associated with the UE;
   extracting, by the access point, a link identifier from the negotiated session parameter; and
   disabling, by the access point, a transmission of a recommendation to the UE based on the negotiated session parameter and the link identifier.

2. The method of claim 1, wherein the data representing the capability of the UE comprises data representing Enhanced Voice Services (EVS) capabilities.

3. The method of claim 1, wherein the data representing the capability of the UE comprises data indicating a supported bit rate mode of the UE.

4. The method of claim 3, wherein the supported bit rate mode comprises a bit rate adaptation mode.

5. The method of claim 3, wherein the data representing a negotiated session parameter comprises a negotiated bit rate mode different from the supported bit rate mode.

6. The method of claim 5, wherein the negotiated bit rate mode comprises a fixed bit rate mode.

7. The method of claim 1, wherein receiving the second notification comprises receiving a control plane message including the second notification.

8. The method of claim 7, wherein receiving the control plane message comprises receiving a Medium Access Control (MAC) control element (CE).

9. The method of claim 1, further comprising:
   receiving, at the access point, a third notification from the UE, the third notification comprising data indicating a second negotiated session parameter; and
   enabling, by the access point, transmission of the recommendation to the UE based on the second negotiated session parameter.

10. A non-transitory computer-readable storage medium for tangibly storing computer program instructions capable of being executed by a computer processor, the computer program instructions defining steps of:
    receiving a first notification from user equipment (UE), the first notification including data representing a capability of the UE;
    receiving a second notification from the UE, the second notification including data representing a negotiated session parameter;
    detecting a change in quality of a network link associated with the UE;
    extracting a link identifier from the negotiated session parameter; and
    disabling a transmission of a recommendation to the UE based on the negotiated session parameter and a link identifier.

11. The non-transitory computer-readable storage medium of claim 10, wherein the data representing the capability of the UE comprises data representing Enhanced Voice Services (EVS) capabilities.

12. The non-transitory computer-readable storage medium of claim 10, wherein the data representing the capability of the UE comprises data indicating a supported bit rate mode of the UE.

13. The non-transitory computer-readable storage medium of claim 12, wherein the supported bit rate mode comprises a bit rate adaptation mode.

14. The non-transitory computer-readable storage medium of claim 13, wherein the data representing a negotiated session parameter comprises a negotiated bit rate mode different from the supported bit rate mode.

15. The non-transitory computer-readable storage medium of claim 14, wherein the negotiated bit rate mode comprises a fixed bit rate mode.

16. The non-transitory computer-readable storage medium of claim 10, the computer program instructions defining steps of:
    receiving a third notification from the UE, the third notification comprising data indicating a second negotiated session parameter; and
    enabling transmission of the recommendation to the UE based on the second negotiated session parameter.

17. A device comprising:
a processor configured to:
- receive a first notification from user equipment (UE), the first notification including data representing a capability of the UE;
- receive a second notification from the UE, the second notification including data representing a negotiated session parameter;
- detect a change in quality of a network link associated with the UE;
- extract a link identifier from the negotiated session parameter; and
- disable a transmission of a recommendation to the UE based on the negotiated session parameter and a link identifier.

18. The device of claim 17, wherein the data representing the capability of the UE comprises data indicating a supported bit rate mode of the UE.

19. The device of claim 18, wherein the supported bit rate mode comprises a bit rate adaptation mode.

20. The device of claim 18, wherein the data representing a negotiated session parameter comprises a negotiated bit rate mode different from the supported bit rate mode.

* * * * *